Aug. 21, 1928.  J. S. FOX  1,681,474
LAUNCHING AND LANDING PLATFORM
Filed Sept. 27, 1926  2 Sheets-Sheet 1
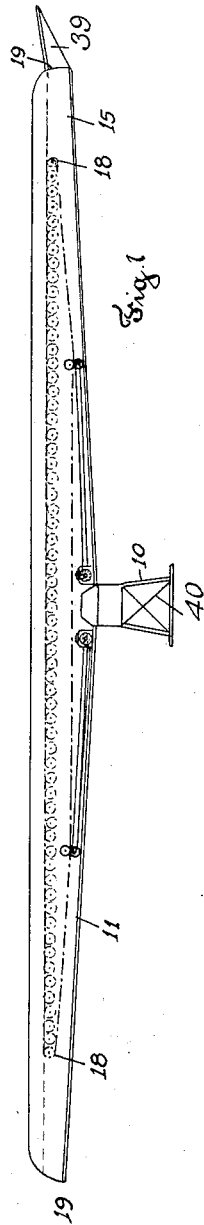
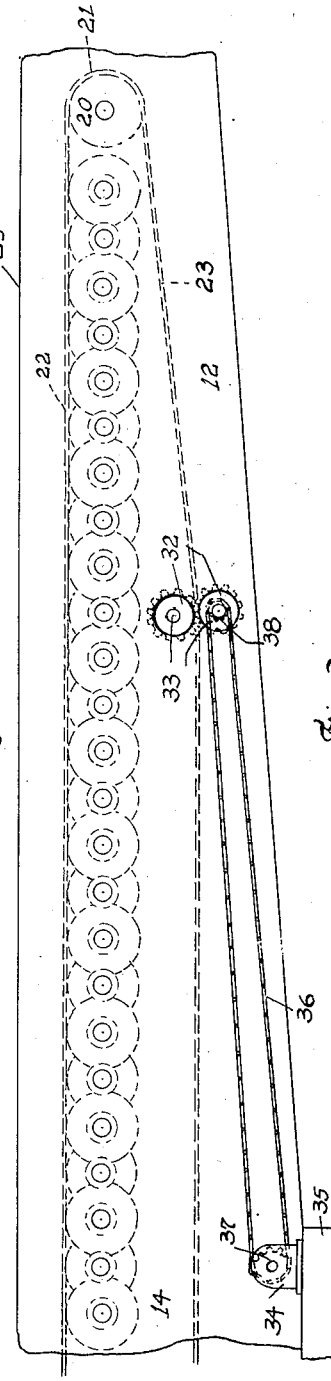
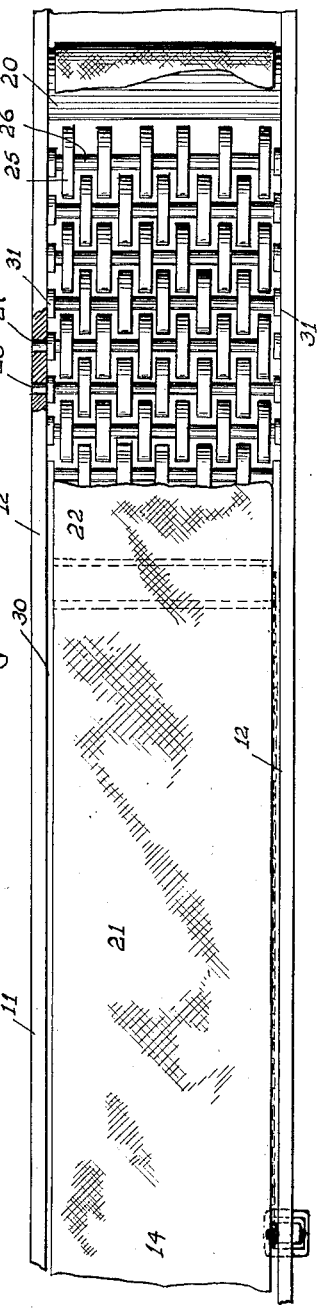
Inventor:
Julius S. Fox
BY: Frank D. Gray
ATTORNEY.

Aug. 21, 1928.
J. S. FOX
1,681,474
LAUNCHING AND LANDING PLATFORM
Filed Sept. 27, 1926   2 Sheets-Sheet 2
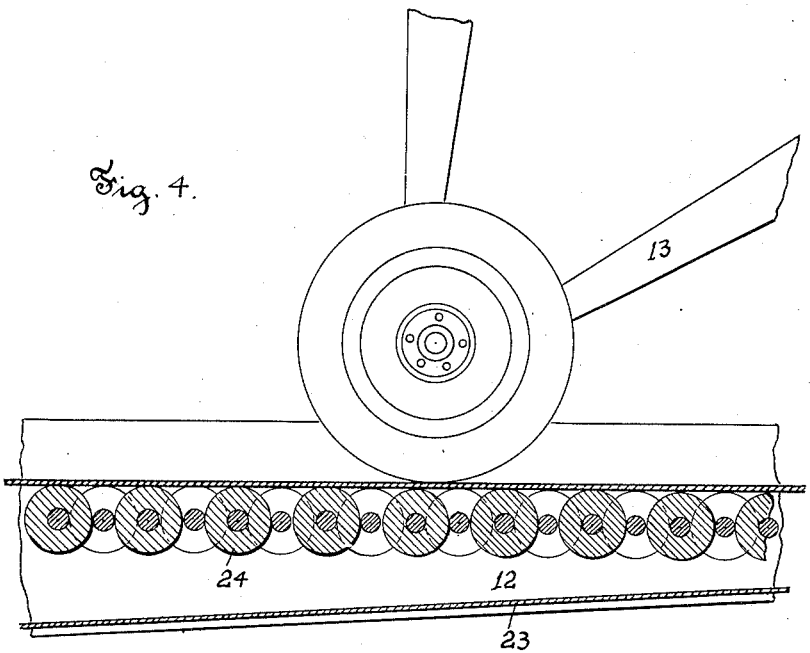
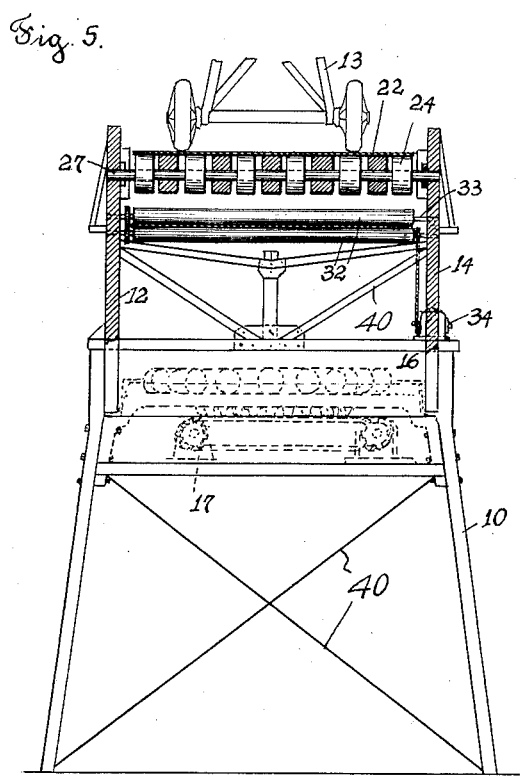
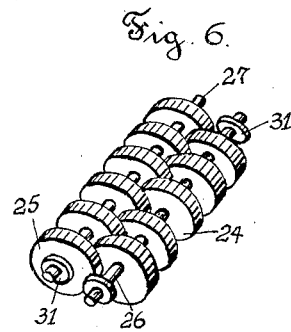
Inventor.
JULIUS S. FOX
BY Frank D. Gray
ATTORNEY Patented Aug. 21, 1928.

1,681,474

UNITED STATES PATENT OFFICE.

JULIUS S. FOX, OF CLEVELAND, OHIO.

LAUNCHING AND LANDING PLATFORM.

Application filed September 27, 1926. Serial No. 137,893.

This invention relates to launching and landing platforms, and especially to power-driven treads for such platforms, the treads being constructed of two elements, one of which comprises an endless traveling web whose upper run is normally substantially level with the floor surface of the platform, and the other element consists of a series of rotating members mounted transverse of the platform and pivoted thereon but beneath said upper run of the belt or web. The latter serves to provide adequate strength for the tread to bear suitably the weight of the vehicles imposed thereon, and the former providing a very uniform tread surface though supported by the rotating members.

It is an object of my invention to provide a platform in which a portion only may be devoted to mounting a tread movable thereon relative to the main surface of the platform, or the entire length of the platform may be so provided with the movable tread. In any case, it is an object of my improved landing platform that the tread webs may consist of an endless belt of an integral length not requiring a plurality of strands to compose the tread surface.

It is a further object of my invention to provide my platform with an endless web of a width approaching closely the inside width of the platform and whose lower run shall extend below the bottom of the platform, and to drive such web by frictional contact directly with such lower run.

With these and other objects in view, I have disclosed my invention by describing herein a construction in which I have embodied my invention, recited the same in the appended claims, and illustrated it in the accompanying drawings, in which—

Figure 1 is a side elevation of the platform and its mounting;

Figure 2 is a side view of a portion of the structure shown in Fig. 1, but on a larger scale, parts being broken away;

Figure 3 is a plan view of the structure shown in Fig. 2, a portion of the upper tread web being broken away to show the supporting means therefor;

Figure 4 is a longitudinal section of the tread surface of the platform, with the support means of a vehicle shown diagrammatically above, and the roller support mechanism for the web thereunder;

Figure 5 is a vertical section of the platform and its support, and

Figure 6 is a perspective detail of two of the supporting rollers for the tread.

Upon an upright foundation or tower 10 is mounted my swinging platform 11 which has the usual elongated side walls 12 which are spaced apart sufficiently to provide needed intermediate distance to permit one or more vehicles shown by illustration as the wheels of an aerial vehicle 13, in Figs. 4 and 5 of the drawings. These walls 12 are somewhat wedge-shaped, being wider at the mid-point 14 of the platform, and tapering gradually toward the narrower ends 15. These side walls 12 are mounted in spaced relation upon a rotatable inverted cup-shaped member 16 which rests upon the upper plate of the tower 10 through the intermediacy of suitable bearings—shown here as ball bearings, for rotation about a vertical axis. Proper driving mechanism 17 is mounted beneath such bearings and upon some fixed part of the tower for swinging the platform 11 on such axis.

Means may be provided for adjusting such platform in other planes as well as in the horizontal, but they do not especially concern this particular invention, and are not further disclosed herein. The tread surface of this platform is constructed as follows: From certain points 18 spaced somewhat from the extreme ends 19 of the main portion of the platform, are provided certain rotatable elements such, for example, as cylinders 20, one at each of said extreme points 18, over which is guided an endless web 21 whose upper run 22 forms the tread surface within the platform space, and whose lower run 23 travels back from point 18 to the other, beneath the bottom of the platform tread base.

Between the points 18 and between the cylinders 20, are mounted a series of plural-disc rollers 24 comprising a plurality of spaced discs 25 all of which are fixed upon, and usually integral therewith, a common axial shaft 26 which has short stub ends 27 which are intended to be received in suitable apertures 28 in the respective side walls 12 of the platform 11, so that the tread surface 21 shall be normally a short distance from the upper edge 29 of said walls, and thereby providing side rails or guide members 30.

At either end of the axis 26 of these rollers, is mounted a fixed washer element 31 whose function is to space the end disc of the roller from frictional engagement with the walls 12. The space between the several discs 25 of the different rollers is always constant, but the distance between the end disc of a roller and the end of the shaft upon which it is mounted, may be quite different from the corresponding distance between disc and shaft end of the adjacent roller. This special arrangement to make possible the closely nested mounting of the discs of all the rollers to provide as nearly a continuous upper surface as possible. To do this, the rollers 24 are provided in two sets, one set, such as A having an even number of tread discs 25 thereon, while the other set B has an odd number of discs 25, the discs on A being quite closely mounted to the shaft ends, just within the washers 31, while the discs 25 of the rollers B are spaced quite perceptibly from their end washers 31 of the shaft ends.

The result of this arrangement is the possibility of fitting the rollers B between the rollers A, as clearly shown in Figs. 3 and 6. The washers 31 are always mounted closely to the inside surface of the side walls 12, to thereby forbid the undesirable shifting of the rollers laterally in the bearings of walls 31. The discs 25 of any roller are therefore arranged alternately with the discs of the rollers on either side thereof. The first roller within the cylinders 20 at each end of the platform, is mounted quite close to the adjacent cylinder, and the entire space between such cylinders is substantially filled with the disc rollers having their discs fitted together in the alternate arrangement shown in Fig. 3.

The endless belt or web 21 is driven continously with the upper run 22 covering the roller discs by running in direct contact with the edges of the discs, as they are exposed to said web. The lower run 23 of the web or belt travels below the rollers 24 and between the walls 12. This belt is driven by power applied to the lower run 23, as will now be described. A pair of driving rolls 32 are mounted in the side walls 12 in much the same manner that the rollers 24 are pivoted therein, though these stub shafts 33 of the rolls 32 are mounted sufficiently below the tread rollers so that no risk is present of interference between 32 and 24.

The rolls 32 may have suitable facing, such as some caoutchouc facing which will engage the web running therebetween, tightly to drive the lower run of the web forward, as may be desired. The ends of the rolls 32 are provided at both ends, within the walls 12, but outside the driving surfaces, with engaging gears whereby power may be transmitted to the upper rolls from the lower. The lower rolls are driven from a motor 34, usually electric, and mounted near the center of the platform, and upon a platform 35 forming a part of the structure of the main platform itself. A sprocket chain 36 may be utilized to transmit power from sprocket 37 of the motor to the sprocket 38 on the stub shaft 33 of the lower roll 32, and thereby the rolls 32 are driven from a motor at some distance therefrom, and at the same time providing for driving the web 21 at a point near the cylinders 20.

As shown in Fig. 1, there are provided two of these pairs of driving rolls 32, the two sets being exact duplicates, but applying the power of the two motors at quite distant points and at the same time.

It is to be noted that by my structure herein explained, I have attained the desirable result of providing yieldable endless travel belt whose upper run may be driven at the desired speed and yet with the advantages that always results from using endless belt tread surface; that I provide a yielding tread surface for my landing platform without forfeiting any part of the desirable positive support means underneath the web; that I may drive the upper run of the endless belt upon which the tread of the vehicle is applied, although no part of the power for driving the said upper run is applied directly to such upper run. The alternate arrangement of the roller discs 25 provides a surface support for the upper run 22, such support being as nearly uniform as it is believed to be possible while mounting the support means wholly independent of the web itself. There is too, a decided advantage in applying the power for the movable tread, to the web rather than to any part of the support element.

At the ends of the platform 11, I provide elongated end plates 39 which serve the purpose of making easy landing from the body of the platform to the desired stationary base. Needed bracing 40 may be provided, but the particular details of such supports are not a part of this invention.

Having thus described my invention what I claim as new and desire to secure by Letters Patent of the United States is as follows—

1. A launching and landing platform for aerial vehicles, comprising an endless traveling element having its upper run substantially level with the surface of the platform, and its lower run extending below the same, and power-driven means for directly driving the lower run of said element, and roller supporting means in said platform directly beneath said upper run and comprising a series of sectional, elongated roller elements pivotally mounted transversely of the platform and directly beneath the upper run, the upper edges of said roller elements of the entire series forming together a continuous supporting tread surface for the upper run of said traveling element to support it and the load carried thereby.

2. A launching and landing platform for aerial vehicles, comprising an endless web running in the plane of the length of the platform and having its upper run substantially level with the surface of the platform tread, a series of roller elements mounted in the side walls of the platform beneath the said upper run of the web, and such rollers having thereon spaced, cylindrical discs fixed to the axis of the rollers, and such rollers being so mounted in position that the discs of any one roller will lap by the periphery of the discs on the adjacent rollers and thereby provide a substantially continuous supporting surface for the web.

3. A launching and landing platform for aerial vehicles, comprising an endless traveling belt having its upper run extending over a portion of the length of said platform at substantially the level of the floor thereof, and the lower run of said belt extending below the floor, power-driven roller means for driving said belt by engaging the lower run of the belt, and supporting means mounted in said platform directly beneath the upper run and comprising a series of sectional, elongated roller elements pivotally mounted transversely of the platform and directly beneath the upper run, the upper edges of the roller elements of the entire series forming together a supporting tread surface for the upper run of said belt.

In witness whereof I have hereunto set my hand and seal this 21st day of September, 1926.

JULIUS S. FOX.